United States Patent
Glebov et al.

(10) Patent No.: US 6,823,097 B2
(45) Date of Patent: Nov. 23, 2004

(54) OPTICAL SWITCHING APPARATUS WITH DIVERGENCE CORRECTION

(75) Inventors: Alexei Glebov, San Bruno, CA (US); Michael Lee, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 10/131,919

(22) Filed: Apr. 24, 2002

(65) Prior Publication Data
US 2003/0202732 A1 Oct. 30, 2003

(51) Int. Cl.$^7$ ............................................. G02B 6/26
(52) U.S. Cl. .............................................. 385/16; 385/4
(58) Field of Search ........................... 385/25, 26, 27, 385/16, 17, 18, 31, 36, 129, 130, 4

(56) References Cited

U.S. PATENT DOCUMENTS

| | | | |
|---|---|---|---|
| 4,472,797 A | 9/1984 | Nicia | 370/1 |
| 4,826,292 A | 5/1989 | Spohr et al. | 350/321 |
| 5,321,548 A | 6/1994 | Takase | 359/431 |
| 5,321,781 A | 6/1994 | Cox | 385/36 |
| 5,761,355 A | 6/1998 | Kuper et al. | 385/36 |
| 5,912,764 A | 6/1999 | Togino | 359/367 |
| 5,978,144 A | 11/1999 | Li et al. | 359/640 |
| 6,400,855 B1 * | 6/2002 | Li et al. | 385/4 |
| 6,549,700 B1 * | 4/2003 | Sweatt et al. | 385/25 |

* cited by examiner

*Primary Examiner*—Karl D. Frech
(74) *Attorney, Agent, or Firm*—Sheppard Mullin Richter & Hampton LLP

(57) ABSTRACT

It is disclosed that an optical switching apparatus enables to increase a number of channels to be accommodated within an optical switching apparatus. The optical switching apparatus includes a common waveguide. The common waveguide is located between a first plural light deflection elements and a second plural light deflection elements, each including prisms made by electro-optic material. The side surface of the prisms is constructed to have a lens. When a light beam which passes through the prisms, the divergence of light beam is corrected. When a plurality of deflected light beams are propagated from the first plural light deflection elements to the second plural light deflection elements within the common waveguide, widening width of light beam can be avoided.

27 Claims, 7 Drawing Sheets

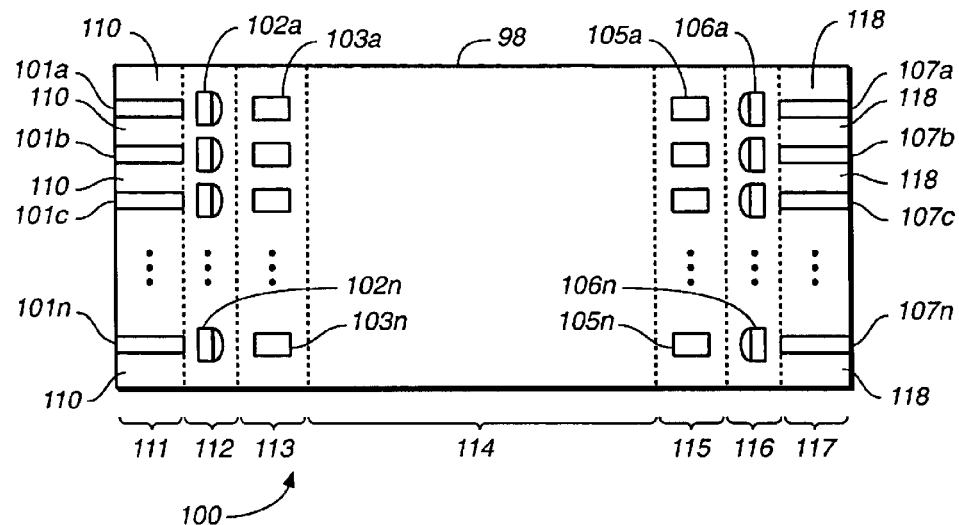
FIG._1
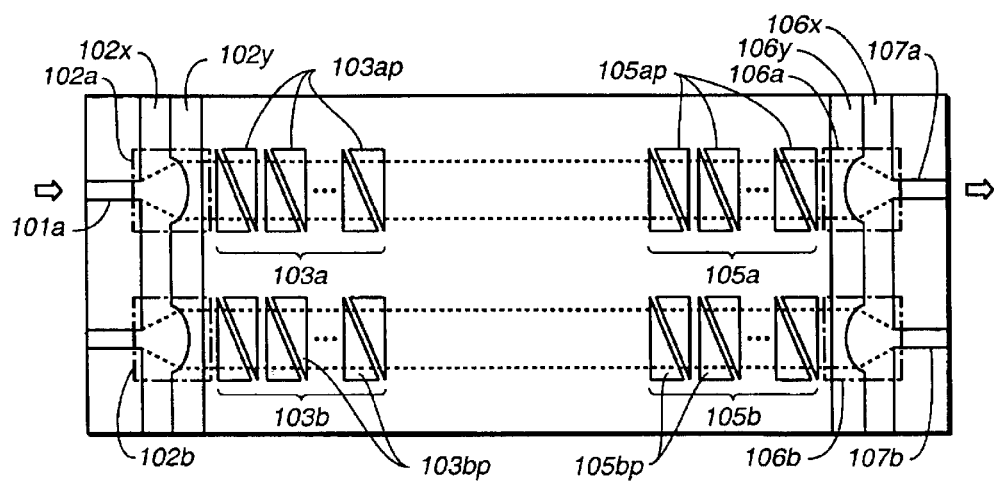
FIG._2

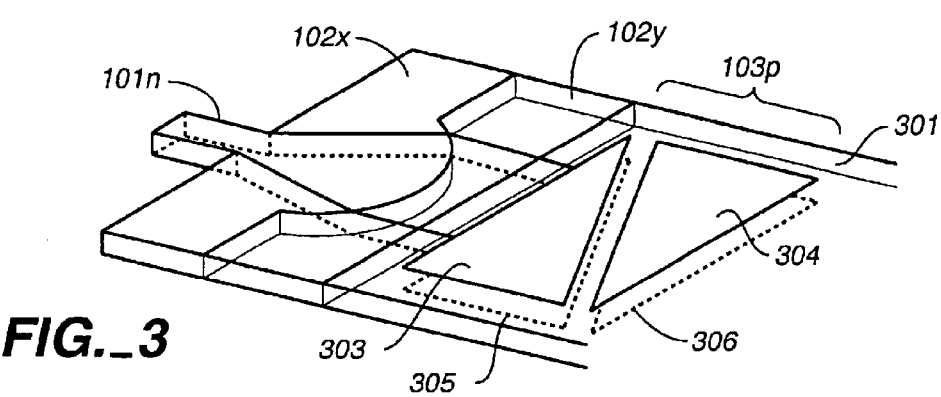
FIG._3
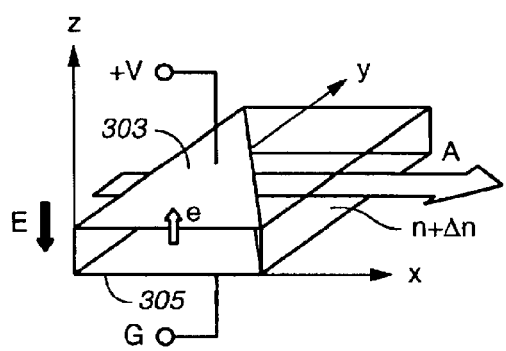
FIG._4A
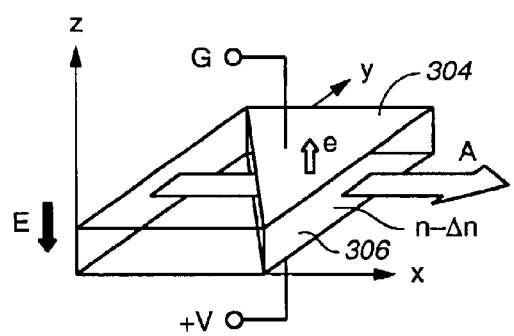
FIG._4B

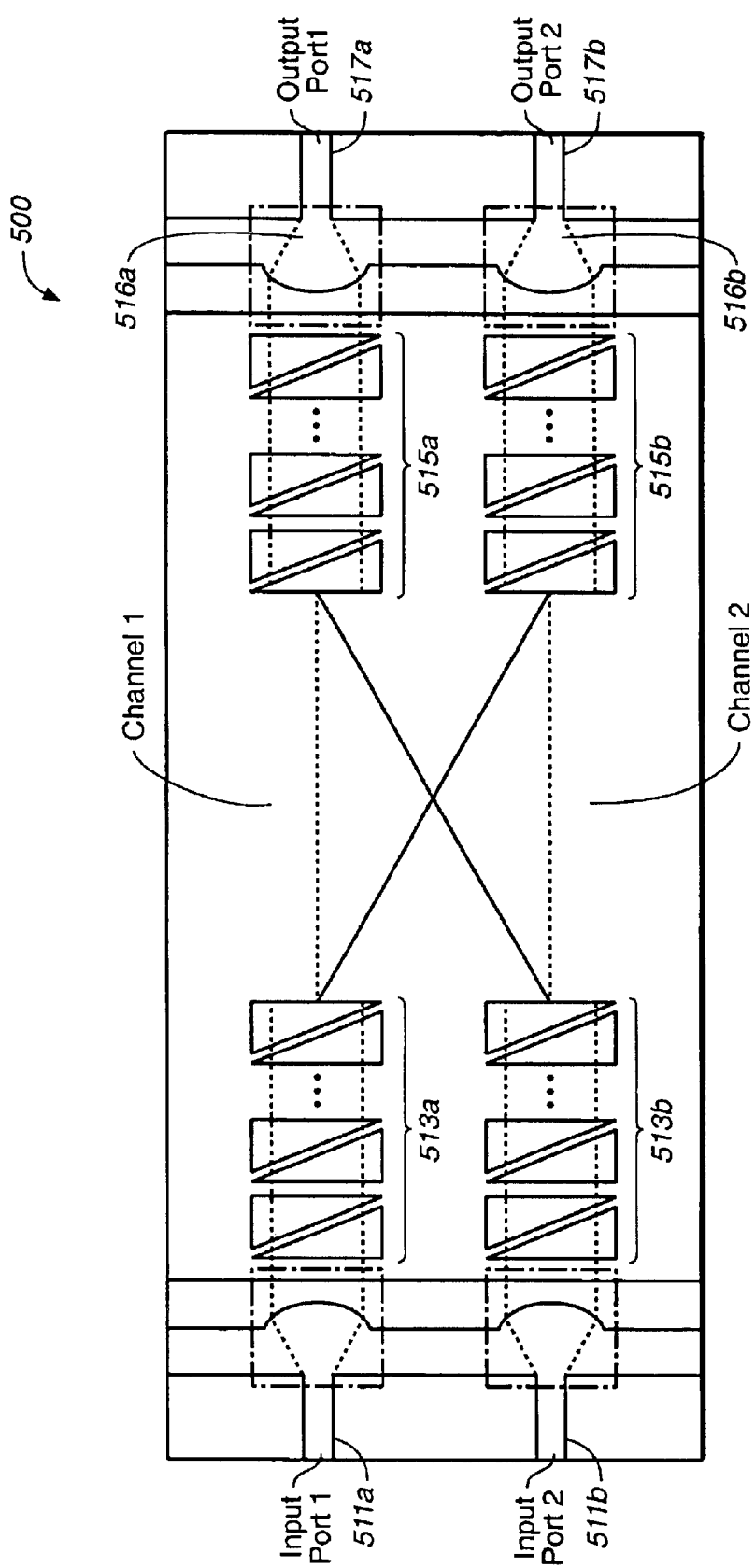
FIG._5

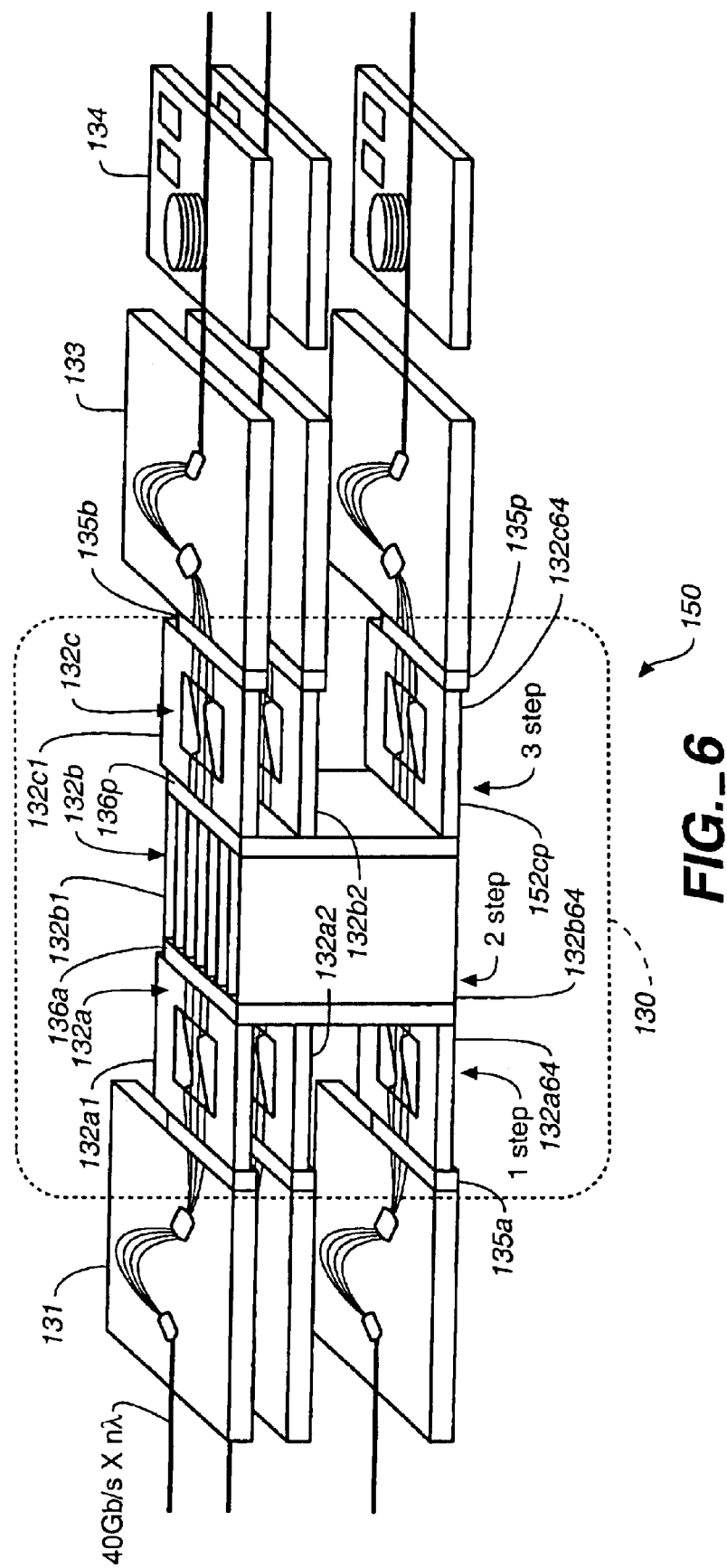
FIG._6

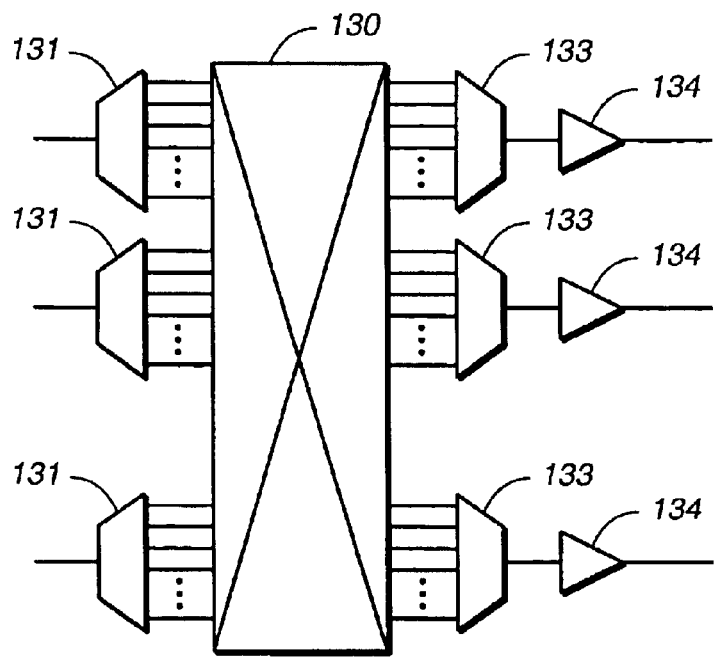
FIG._7
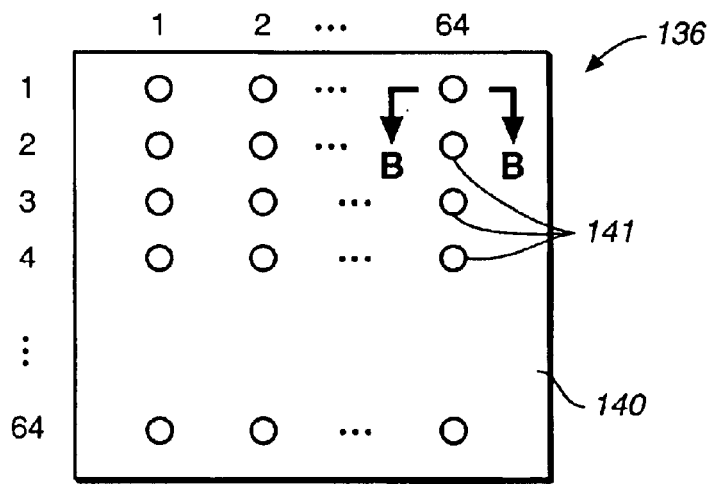
FIG._8A
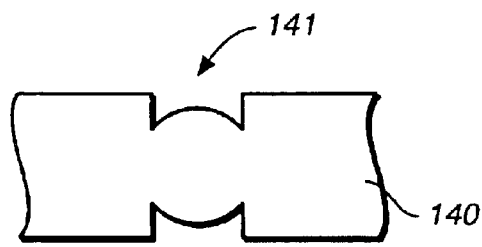
FIG._8B

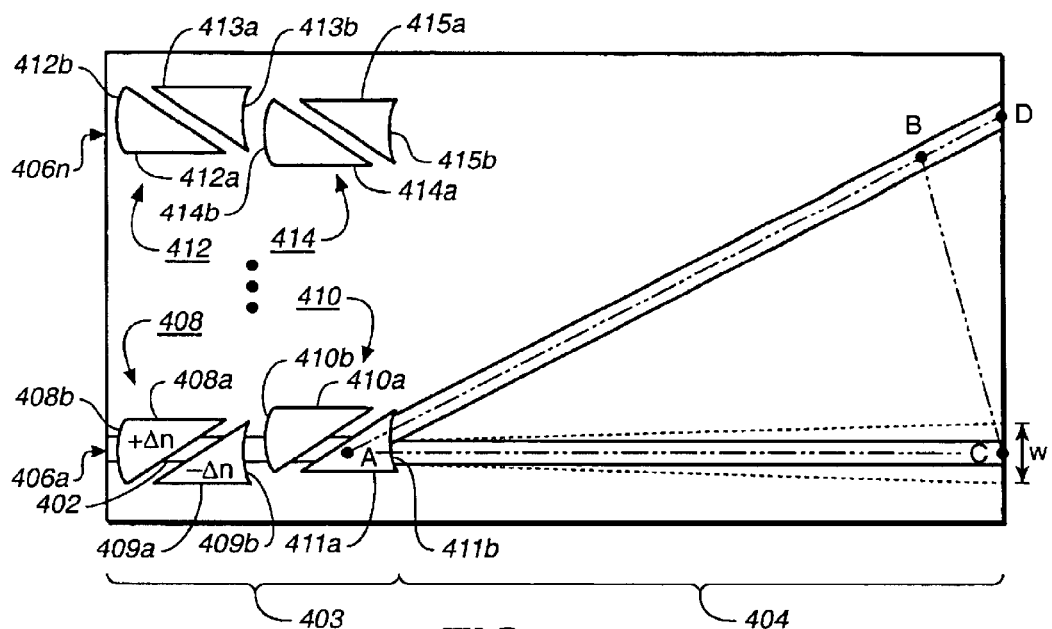
FIG._9
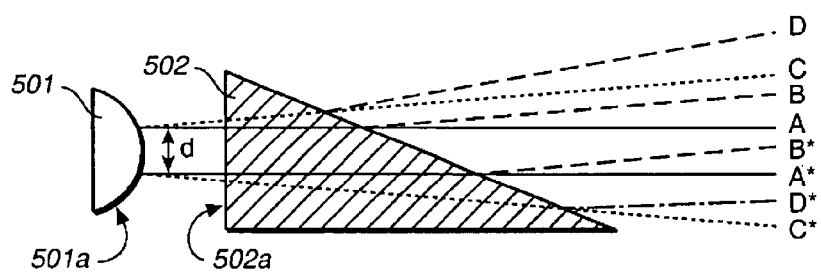
FIG._10A
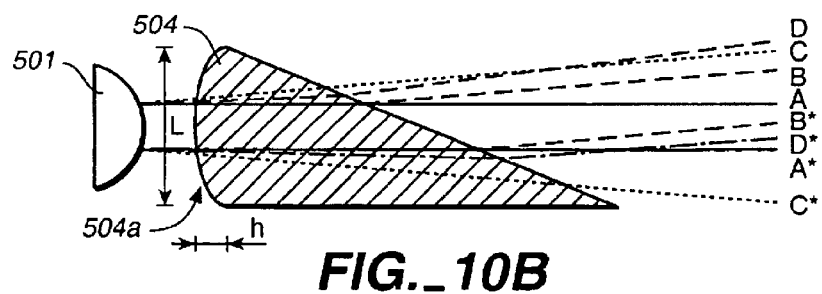
FIG._10B

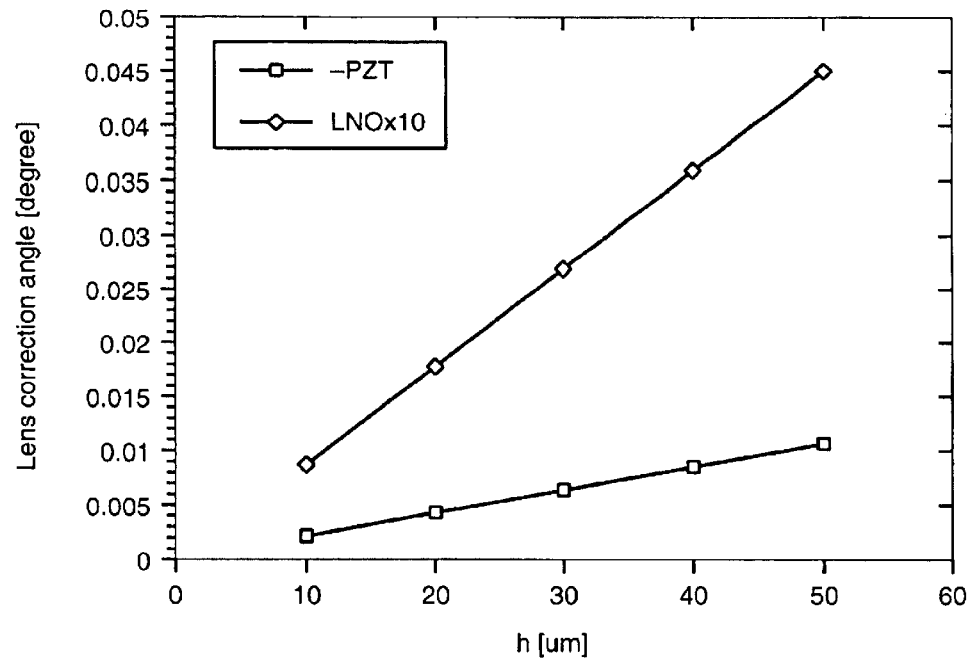
FIG._11
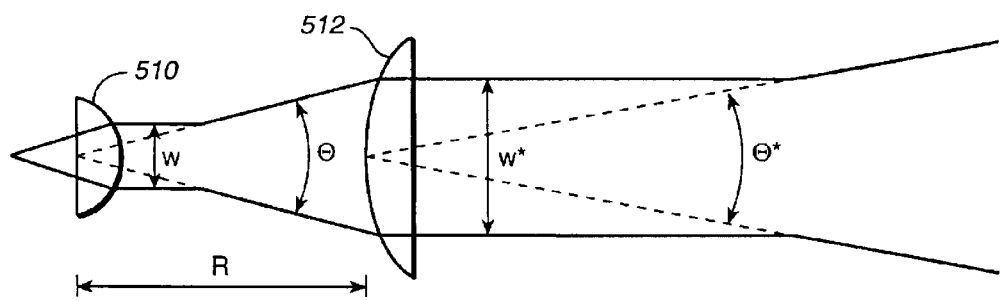
FIG._12

OPTICAL SWITCHING APPARATUS WITH DIVERGENCE CORRECTION

BACKGROUND OF THE INVENTION

1. Field of the Invention

This invention is related to an optical switching apparatus for use in optical networks for voice and data communications. In particular, the present invention is directed to an optical switching device with divergence correction of light beams which propagate in a waveguide of an optical switching apparatus.

2. Description of the Related Art

The strong growth of optical networks for voice and data communication has created a huge demand for high data rate information transfer capabilities. To enable such transfer capabilities, dense wavelength division multiplexing (DWDM) technology has been developed which allows transfer of multiple wavelength light beams over a single optical fiber leading to data transfer rates up to 40–100 Gb/s. High speed switching and routing devices comprise the core elements of the optical networks and allow dynamic control of the data traveling over the optical network. High data transmission rates impose significant demands on the functionality of the switching devices.

Optical cross-connect space division switches based on optic-electro (OE) deflection of the light beam have great potential for use in high speed optical networks. The basic requirements for such devices are the need for extremely fast switching time and the capability to handle a large number of input and output channels, e.g., up to 4000×4000 by the year 2003. Reliability and cost are also important design factors for optical switching devices. Existing optical switching devices which employ signal conversion from optical into electrical and back into optical do not satisfy the anticipated requirements for such devices.

Switching matrixes having very low switching times can be designed to connect a very large number of input and output (I/O) ports. Such switches may be built from an assembly of simple digital optical switches where each can redirect one input signal into two possible output ports. However, optical cross-connect switching elements are more useful for large-scale implementations. These devices require large-scale monolithic switch arrays to perform switching functions. Although, the principles used in optical cross-connect switching based on light beam deflection is well known, a robust, reliable, low cost and extendable integration process for such type of switching device is not available.

Currently, the main optical switching products on the market (e.g. Lucent's Lambda-router) are based on MEO-NIS technology, which employs rotating micro-mirrors to deflect light. However, these optical switching devices are not very reliable due to the large number of moving parts, and the limitation on the switching time caused by the mechanics of the mirrors. It is desirable to improve the reliability of the moving parts of the optical switching devices and to overcome the limitation of the switching time in these devices due to the mechanics of the micro-mirrors.

There are several other optical switching technologies which have been proposed but which are still not well represented in the market due to various technological and economic difficulties. Such optical switching technologies include by way of example: the bubble switch from Agilent Technologies Inc., switches based on liquid crystals, and thermo-optic and electro-optic (EO) effects, etc. Most of these devices are still in the R&D stage. Some of these technologies, including EO switches, may be applicable for high speed, low cost, high reliability, and high I/O port count products.

Existing EO switch designs, however, require at least two paths from the switch, and a channel waveguide for each path in order to transmit a light input without divergence. Such channel waveguides require a relatively large amount of space in the switching device. As more channels are incorporated into the optical switching device, much more space for the channel waveguides is required therein.

Therefore, there is a need for an improved optical switching device which does not require as much space therein. There is a further need for an improved optical switching device with divergence correction of the light beams transmitted through the device.

SUMMARY OF THE INVENTION

Embodiments of the present invention provide: a compact optical switching device with improved divergence correction of the light beams which propagate in an optical switching device without having a channel waveguide. The optical switching device of the present invention includes EO material sandwiched by electrodes. In accordance with an aspect of the present invention, the EO material has a lens portion for collimating light.

The optical switching apparatus of the present invention enables a large number of channels to be accommodated within the optical switching apparatus.

These features together with the various ancillary provisions and features which will become apparent to those skilled in the art from the following detailed description, are attained by the optical switching apparatus and method of the present invention, preferred embodiments thereof being shown with reference to the accompanying drawings, by way of example only, wherein:

BRIEF DESCRIPTION OF DRAWINGS

FIG. 1 is a schematic diagram showing an optical switching module of the present invention.

FIGS. 2 and 3 schematically illustrate the details of the structure of the optical switch module of the present invention.

FIGS. 4(A) and 4(B) are schematic diagrams showing deflection of light of a prism pair in accordance with the present invention.

FIG. 5 is a schematic diagram showing a 2 by 2 channel optical switch module of the present invention.

FIG. 6 is a schematic diagram of a light signal switching apparatus using the optical switch module of the present invention.

FIG. 7 is a schematic diagram of a portion of the light signal switching apparatus of FIG. 6.

FIGS. 8(A) and 8(B) are schematic diagrams showing the structure of a light connector of the present invention.

FIG. 9 is a schematic diagram of another embodiment of the structure of an optical switching device of the present invention.

FIGS. 10(A) and 10(B) are drawings for explanation of divergence correcting by EO deflector.

FIG. 11 is a graph showing the calculated angular correction of divergence for $LiNbO_3$ and PZT.

FIG. 12 is a schematic presentation of collimation of a Gaussian beam in a two lens optical system.

DETAILED DESCRIPTION

Referring now to the drawings in combination with the description hereinafter presented, there is illustrated and described an improved optical switching apparatus and an integration process, which allows fabrication of a non-blocking optical cross connect switching matrix with a large (e.g., up to 4000 or more) number of I/O channels. The optical switching device of the present invention employs EO induced deflection of an incoming optical beam or optical signal to reroute the incoming light signal from an input port to an output port. EO induced light beam deflection in piezoelectric materials is known and is described, for example, in an article entitled "Low-Voltage Drive Electro-Optic Pb (Zr, Ti) $O_3$ Waveguide Devices Fabricated By Solid-Phase Epitaxy" to Nashimoto et al of the Corporate Research Laboratories of Fuji Xerox Co., Ltd., Japan.

A hybrid integration process including an OE deflecting element disposed on a silicon substrate, allowing fabrication of a (2×2) cross-connect switching device is described for illustrative purposes. The (2×2) cross-connect switching device is used for illustration only, and embodiments of the integration process can easily be extended to fabricate switching systems with much larger number of I/O ports, such as 4000×4000 input/output ports or more.

While a silicon substrate is employed to exemplify the process, the silicon substrate may be replaced by any other substrate, e.g., glass plate, printed circuit board, etc., which may be chosen according to the design requirements.

The switching element or EO device in the present example is made from $LiNbO_3$ (lithium niobate, hereinafter termed as "LN") with a transition metal (e.g., Ti) in-diffused waveguide and with top and bottom electrodes which are generally prism shaped. It is to be understood that LN may be replaced by any material with a strong electro-optical coefficient. The material of the switching element may be either a bulk or thin film material and the electrodes may be made in various shapes, such as prisms, gratings, various combinations and arrays of prisms and gratings, etc. Thus, it is contemplated that the present invention is not limited to lithium niobate, but may employ any other suitable electro-optic material to be formed as a wafer.

Optical switching devices and deflectors which may be used to implement the present invention are described in Japanese patent application number Tokugan 2001-040006, filed on Feb. 16, 2001 and Japanese patent application number Tokugan 2001-56009, filed on Feb. 28, 2001, the disclosures of which are incorporated by reference. Waveguide circuits and/or optical signal routing and switching are described in the following U.S. patents which are also incorporated by reference: U.S. Pat. No. 6,141,465 to Bischel et al.; U.S. Pat. No. 5,572,540 to Cheng.; U.S. Pat. No. 5,103,494 to Mozer; U.S. Pat. No. 5,894,538 to Presby; U.S. Pat. No. 5,854,868 to Yoshimura et al.; U.S. Pat. No. 5,465,860 to Fujimoto et al.; U.S. Pat. No. 5,835,646 to Yoshimura et al.; U.S. Pat. No. 5,540,346 to Fujimoto et al.; U.S. Pat. No. 5,220,582 to Kaharu et al.; U.S. Pat. No. 5,218,654 to Sauter; U.S. Pat. No. 5,093,890 to Bregman et al.; U.S. Pat. No. 5,822,475 to Hirota et al.; U.S. Pat. No. 5,204,866 to Block et al.; U.S. Pat. No. 5,010,505 to Falk et al.; U.S. Pat. No. 4,850,044 to Block et al.; U.S. Pat. No. 5,375,184 to Sullivan; U.S. Pat. No. 5,757,989 to Yoshimura et al.; U.S. Pat. No. 5,757,989 to Yoshimura et al.; U.S. Pat. No. 5,541,039 to McFarland et al.; U.S. Pat. No. 5,054,872 to Fan et al.; U.S. Pat. No. 5,978,524 to Bischel et al.; U.S. Pat. No. 5,732,177 to Deacon et al.; U.S. Pat. No. 5,488,735 to Tanabe et al.; and U.S. Pat. No. 5,408,568 to Hamilton et. al.

Referring now to FIG. 1 there is seen a schematic diagram showing an optical switch module, generally illustrated as 100. The optical switch module 100 comprises an input side optical waveguide portion 111, an input side collimating portion 112, an input side deflecting portion 113, a common optical waveguide portion 114, an output side deflecting portion 115, a focusing portion 116, and an outside optical waveguide portion 117. The input side optical waveguide portion 111, the input side collimating portion 112, the input side deflecting portion 113, the common optical waveguide portion 114, the output side deflecting portion 115, the focusing portion 116, and the outside optical waveguide portion 117 are all integrally formed on a substrate 98. To the extent that the manner of fabricating the various "portions" are not described herein, the fabrication techniques are either well known to those skilled in the art, or are described in the documents incorporated by reference.

The input side optical waveguide 111 is constructed of a plurality of optically transparent and lithographically patterned layers, sometimes referred to as "core" $101a$–$101n$, and clad layers 110. Each comprises a three-layer stack with the core layer being sandwiched between the two cladding layers. This three-layer structure confines the optical beams within the respective core layers $101a$–$101n$ due to the difference of refractive index between the core and the clad layer. The output side of waveguide 117 is similar to the structure of the input side of waveguide 111 and is constructed of a plurality of optical layers, so called cores, $107a$–$107n$, and clad layers 118 which form three-layer structures $107a$–$107n$ in the same manner.

As shown in FIG. 1, the number of the optical waveguides $101a$–$101n$ of the input side of optical waveguide 111 is equal to the number of the optical waveguides $107a$–$107n$ of the output side of optical waveguide 117. The number of the optical waveguides $101a$–$101n$ and the number of the optical waveguides $107a$–$107n$ is equal to "n" where "n" is an integer having a value of two or more. In other embodiments of the invention, the number of the optical waveguides on the input side of optical waveguide 101 may be different from the number of the optical waveguides on the output side of optical waveguide 117.

The collimating portion 102 is comprised of "n" number of micro-lenses or collimating lenses $102a$–$102n$. Each of the collimating lenses $102a$–$102n$ is either integrally formed with, or is located at a position slightly apart from the end portion of respective optical waveguides $101a$–$10n$. The light outputs from optical waveguides $101a$–$101n$ initially broaden out in a divergent manner, but are then collimated by the collimating lenses $102a$–$102n$.

In the input side deflection portion 113, "n" number of light deflection elements $103a$–$103n$ are provided. Each of the light deflection elements $103a$–$103n$ is positioned at a location slightly apart in a light axis direction from respective collimating lens $102a$–$102n$. Each light deflection element deflects or changes the propagation direction of light signal by using either quadratic or linear electro-optic effects.

The common optical waveguide 114 is constructed as a slab type waveguide, in which the light mode is confined in the core layer only vertically and not horizontally. Common optical waveguide 114 transmits light that passes through the input side light deflection portion 113 to the output side light deflection portion 115. Thus, a plurality of optical signals pass through common optical waveguide 114 at the same time. Since each of these plural optical signals moves in a predetermined direction within the common waveguide 114, they do not interfere or distort each other.

At the output side light deflection element portion 115, "n" number of light deflection elements 105a–105n are provided. These light deflection elements 105a–105n deflect, change, or alter an optical beam, optical signal, or a light wave that the light deflection element receives after passing through the common optical wave guide 114. Light deflection elements 105a–105n, respectively, change direction of respective optical beams to a direction parallel to the optical axis direction of corresponding respective optical waveguides 107a–107n. In a preferred embodiment of the direction, both light deflection elements 103a–103n and 105a–105n have generally the same structure.

The focusing portion 116 is comprised of "n" number of focusing lenses 106a–106n. These focusing lenses 106a–106n guide the light signals that passes through the respective light deflection elements 105a–105n to the optical waveguides 107a–107n by focusing the light signals.

The waveguides or cores may be manufactured of any suitable material. For example, the waveguides may be formed using a highly transparent, highly heat-resistant polymer such as a fluorinated polyimide, or quartz or another glass or polymer material. Similar materials may also be used for the cladding layers, or an organic and/or inorganic hybrid may be used. Suitable methods for forming films of these polymer systems include spin coating, dip coating, spray coating, or vapor phase growth processes such as evaporation polymerization or CVD. For glass systems, sputtering, evaporation, CVD or the like may be employed, and when a sol-gel method is used, spin coating, dip coating or spray coating may be employed.

The details of the collimating lens portion 112, the input side light deflection element portion 113, the output side light deflection element portion 115, and the focusing portion 116 in optical switch module 100 are explained with reference to FIGS. 2 and 3.

Each of the collimating lenses 102a–102n, which are constructed of the same material as the collimating portion 112, as shown in FIGS. 2 and 3, is preferably a two-dimensional lens comprised of two portions 102x and 102y, with each portion having a different refractive rate or index from the other. The portion 102x, having a relatively higher refractive rate (a convex lens portion), is preferably formed by the same material used for forming the optical waveguides or cores 101a–101n and 107a–107n. Portions 102y and 106y, having a relatively lower refractive rate, are preferably comprised of openings filled with air or other gas, or any suitable material (e.g., gels) having a refractive index lower than the refractive index of the core (e.g., portions 102x and 106x).

The focusing lenses 106a–106n of the focusing portion 106 are similar to the collimating lenses 102a–102n. Each focusing lens includes a portion (a convex lens portion) 106x having a high refractive rate and a portion 106y having a low refractive rate. Preferably, the refractive direction of focusing lenses 106a–106n is opposite to the refractive direction of collimating lenses 102a–102n.

Light deflection elements 103a–103n, constructed as part of the input side light deflection portion 113, comprise one or more prism pairs 103ap–103np. In a less preferred embodiment one or more individual prism, rather than prism pairs, may be used. One prism pair 103p, as shown in FIG. 3, includes a slab type waveguide 301 made from a material having electro-optic effects. As is well known in the art, an electro-optic material can be made to change its optical properties by the application of a suitable electric potential. As shown in FIG. 3, first and second upper electrodes 303 and 304 are formed on the upper side of slab type waveguide 301, and first and second lower electrodes 305 and 306 are formed on the lower side of slab type waveguide 301. The first and second upper electrodes 303 and 304 and the first and second lower electrodes 305 and 306 may each be formed substantially in a shape of a triangle (e.g., a wedge shape), respectively.

The first upper electrode 303 and the first lower electrode 305 are generally opposed and slab type waveguide 301 is positioned there between. The first upper electrode 303 and the second upper electrode 305 are spaced apart and face each other along an oblique side associated with each of the upper electrodes. The second upper electrode 305 and the second lower electrode 306 are also generally opposed with slab type waveguide 301 positioned there between. Thus, the slab type waveguide 301 is common for each prism pair 103p. By using such a structure for each prism pair 103p, the size of each prism pair may be reduced.

Continuing to refer to FIG. 2, the light deflection elements 105a–105n of the output side light deflection portion 105 are similar to the input side light deflection elements 103a–103n, and include the slab type waveguide 105b made from a material having electro-optic properties, and one or more prism pairs 105ap–105np. Each of the prism pairs 105p is generally the same as each of the prism pairs 103p, and more specifically includes first and second electrode pairs (not shown), which correspond to and are essentially the same as first and second upper and lower electrodes 303, 304, 305 and 306, respectively. In a preferred embodiment, the first and second upper electrodes and the first and second lower electrodes for the prism pair 105p are generally triangular. A controllable source of electrical potential (not shown) is coupled to the electrodes to activate the opto-electric material. Suitable controllable sources for applying electrical potentials to the electrodes are well known to those skilled in the art and need not be described in further detail.

Referring now to FIGS. 4(A) and (B) a schematic diagram is seen for illustrating deflection of light of prism pair 103p (i.e., electrodes 303 and 305 and electrodes 304 and 306). In FIGS. 4(A) and (B), arrow A indicates a direction of a crystal axis of waveguide 301 and arrow E indicates a direction of electronic field applied to the prism pair 103p.

As shown in FIG. 4(A), the first lower electrode 305 is connected to the ground line (G). In this state, when a control voltage (+V) is applied to the first upper electrode 303, the refractive index of waveguide 301 between the first upper electrode 303 and the first lower electrode 305 changes from n to n+Δn. Thus, the transmission direction A of light signal is deflected to the right at an angle θ. On the other hand, when the second upper electrode 304 is connected to the ground line (G) as shown in FIG. 4(B), and a control voltage (+V) is applied to the second lower electrode 306, the refractive rate of the slab type waveguide 301 located between the upper electrode 305 and the lower electrode 306 changes from n to n−Δn. Thus, the transmission direction A of light signal is further deflected to the right at an angle θ. Hereinafter, these electrodes to which the control voltage is applied may also be called control electrodes, which correspond to the first upper electrode 303 and the second lower electrode 306.

Therefore, a light signal can be deflected at an angle 2θ with one prism pair. Thus, when "m" number of prism pairs 103p are located in tandem in a channel, with "m" being an integer having a value of two or more, the deflection direction from the transmission direction of the light signal can be 2θ×m. Since the light propagating in the deflector is confined in the optical core layer it is the core layer which should have electro-optical properties. Cladding layers do not need to be from an EO material. Therefore, the top and bottom electrodes can be placed either directly on the core layer or on the cladding layers. Placing electrode directly on the core layer can result in optical losses due to metal absorption, however, placement directly on the core layer reduces the applied voltage necessary to create a required electric field. The specific configuration selected will depend on the structure of the deflector array, e.g., bulk material or thin films, as well as the system design requirements.

Referring now to FIG. 5, there is seen a 2×2 channel optical switch module 100a. The optical switch module 500 transmits a first light signal input into first input port 1 to either output port 1 or to the output port 2. A second light signal input into first input port 2 is transmitted to the remaining output port not receiving the first light signal, which is output port 1 or output port 2. Thus, if output port 2 receives the first light signal from input port 1, output port 1 would receive the second light signal from input port 2. When there is no crossing of optical signals, such as where a light signal input into the first input port 1 is transmitted to the output port 1, and a light signal input into the second input port 2 is transmitted to the output port 2, a control voltage is not applied to any of the light deflection elements 513a, 513b, 515a, and 515b, and thus, no light signals are deflected at the light deflection elements 513a, 513b, 515a, and 515b. Accordingly, the light signal input into channel waveguide 511a is transmitted to light waveguide 517a, and the light signal input into channel waveguide 511b is transmitted to light waveguide 517b, all without any optical crossing due to any applied control voltage.

Where a light signal input into the first input port 1 is to be transmitted to the output port 2 and a light signal input into the second input port 2 is to be transmitted to the output port 1, a plus control voltage +V is applied to the control electrodes of the light deflection elements 513a and 515b and a minus control voltage −V is applied to the control electrodes of the light deflection elements 513b and S15a. Accordingly, the light signal input into the input port 1 is deflected toward the right hand direction by light deflection element 513a, and then, upon reaching light deflection element 515b, the deflected light signal is deflected again into a direction parallel to the longitudinal axis of optical waveguide 517b at light deflection element 515b, and is focused by focusing lens 516b into the optical waveguide 517b, and then transmitted into the output port 2. Similarly, the light signal input into the input port 2 is deflected in a left hand direction by light deflection element 513b and into light deflection element 115a, and then, upon reaching light deflection element 515a, the deflected light signal is deflected again into a direction parallel to the longitudinal axis of optical waveguide 517a at the light defection element 515a, and is then transmitted to the output port 1 through the focusing lens 516a and the optical waveguide 517a.

Referring now to FIG. 6, a diagram is seen for a light signal switching apparatus 150 using the optical switch module 100 as described previously. FIG. 7 is a schematic diagram of the light signal switching apparatus shown in FIG. 6. The light signal switching apparatus 150 has 64 inputs of WDM signal in which light signals are multiplexed. Each of the 64 light signals may have a frequency as high as 40 Gb/s. The transmittal direction of these multiplexed light signals are switched or changed in the light signal switching apparatus 150.

An exemplary light signal switching apparatus 150 comprises sixty four arrayed waveguide grating (AWG) light dividers 131 arranged along in a vertical direction in FIG. 6, a three step-structure light switch module 130, sixty four light composers 133, and sixty four erbium doped fiber amplifiers (EDFA's) 134. In each step of the three-step structure light switch module 130, there are a plurality of light switch modules, such as optical switch module 100 shown in FIG. 1. More specifically, each step of the three step-structure light switch module 130 includes the plural light switch modules 132a, 132b, and 132c. Each of the plural light switch modules 132a, 132b, and 132c is constructed from sixty-four light switch modules, each having 64×64 channels. More specifically further, each of the sixty-four light switch modules includes sixty-four light input ports and sixty-four light output ports. Each of the sixty-four light switch modules differ from the FIG. 5 light switch module 100a (which has two by two channels) in that the number of the input ports and the number of the output ports is much larger.

In the first step, the sixty-four switch modules 132a1–132a64 are arranged in the direction of the substrate of the light switch module 132a. Similarly, in each second step and each third step, the sixty-four switch modules are arranged to register with the substrate of the respective light switch modules 132b and 132c. As illustrated, in the second step of light switch module 130, the sixty-four light switch modules 132b1–132b64 are disposed at 90 degrees with respect to the light switch modules 132a and 132c in the first and third steps respectively. The sixty-four light switch module 132c in the third step is located around an axis extending along one of the channels of the light switch module 100a.

Each of the light dividers 131 and each of the light switch modules 132a in the first step are coupled by a light connector 135a. Likewise, each of the light switch modules 132a in the first step and each of light switch modules 132b in the second step are coupled by a light connector 136a. Similarly, each of the light switch modules 132b and each of the light switch module 132c are coupled by a light connector 136b, and each of the light switch modules 132c and each of the light composers 133 are coupled by a light connector 135b.

FIGS. 8(A) and (B) show the structure of an exemplary light connector 136. FIG. 8(A) shows a top plan view of light connector 136, and FIG. 8(B) shows a vertical sectional view taken along the plane of the B—B line in FIG. 8(A). As shown in FIGS. 8(A) and (B), the light connector 136 comprises a substrate 140 having a plurality of small lenses 141 through which light signals pass through substrate 140. Thus, in light connector 136, lenses 141 are arranged in a two-dimensional array, but in light connector 135 (FIG. 6), lenses 141 are arranged along a line. The pitch of the lenses 141 is the same as the pitch of the input ports and/or output ports of the light switching modules 132a, 132b, and 132c. The lenses 141 of light connectors 135 and 136 focus the light output from a preceding optical device, transmitting it to a subsequent optical device; thus, they are useful to lower the loss of transmission.

In a preferred embodiment of the optical switching device of the present invention, there is a microprocessor controller for turning on and off the voltage applied to each of the control electrodes of the light deflection elements in each of light switching modules 132a, 132b, and 132c. The microprocessor (not shown in the drawings) is coupled to each of the electrodes of the light deflection elements through conductive paths which transmit electronic signals from the microprocessor.

FIG. 9 shows a schematic structure of an optical switching device. In FIG. 9, an input side deflecting portion 403 and a common optical waveguide portion 404 of an optical switching device such as shown in FIGS. 1-8 are illustrated. As explained above with reference to FIGS. 1-8, the common optical waveguide 404 is a slab type waveguide. Common optical waveguide 404 transmits a light beam 402 that passes through the input side light deflection portion 403 to an output side light deflection portion (not shown in FIG. 9). Within common waveguide 404, plural optical signals pass through at the same time, and there are no channel waveguides for the respective plural optical signal paths.

At the input side light deflection portion 403, there are a plurality of channels 406a–406n. In FIG. 9, two sets of quasi-triangular prism pairs 408a, 409a, and 408n, 409n are shown to depict the fact that there are four prisms (i.e., two prism pairs) for each of the input channels 406a–406n. One set comprising a pair of quasi-triangular prisms 408a, 409a and 410a, 411a constitutes a light deflection element for channel 406a, and one set comprising a pair of quasi-triangular prisms 408n, 409n and 410n, 411n constitutes a light deflection element for channel 406n. These plurality of the light deflection elements for channels 406ap–406n correspond to the first plurality of the light deflection elements. Each of the quasi-triangular prisms is made from a material having electro-optic properties, e.g. lead lanthanum zirconate titanate ("PLZT"), lead zirconate titanate ("PZT"), lithium niobate ("LN"), etc. Similar to the structure shown in FIG. 3, an upper electrode is formed on each of the upper side of the prisms 408a–415a, and a lower electrode is formed on the lower side of the prisms 408a–415a. The shape of the upper and lower electrodes for the respective quasi-triangular prisms 408a–415a, not shown in the figures, is substantially the same as the shape of the respective quasi-triangular prisms 408a–415a.

Each of the first quasi-triangular prisms 408a–n, 410a–n, has a convex lens surface 412, and 414, respectively at its input end. Each of the second quasi-triangular prisms 409a–n, and 411a–n, has a concave lens surface 413 and 415, respectively, at its output end.

Thus, when a light beam 402 passes through the first channel 406a of the optical switching device, the light beam 402 is collimated by an optical system which is made in combination with the convex lens surfaces 412 and 414 and the concave surfaces 413 and 415.

From the structure shown in FIG. 9, divergence of a light beam 402 induced by diffraction, which is one of the severe problems in designing of micro-optic planar devices, is substantially lowered in comparison with the prior art structures without a convex surface and a concave surface on the prisms.

As explained above with reference to FIGS. 1-8, collimating lenses 102a–102n are incorporated into and used in an optical switching device in order to build a planar lightwave circuit ("PLC") including a common waveguide 104 in the optical switch module 100 in which light beams can propagate without channel waveguides. These collimating lenses 102a–102n (also referred to as micro lenses) can respectively collimate the light modes diverging from input optical fibers, not shown in figures, into a nearly parallel beams.

It is desirable to keep the width of the light beam 402 in a range of 200–300 $\mu m$ in order to have a circuit of compact size which can be fabricated on a single wafer. However, a light beam 402 of such narrow size cannot propagate without broadening when there is not a optical waveguide for the light beam. Diffraction caused by collimating lens 102a results in a divergence of light beam 402. The typical divergence angle for 200–300 $\mu m$ of the light beam 402 at the micro collimating lens 102a is about 0.1 degrees. This small divergence results in broadening of the light beam during propagation of the light beam 402 through common waveguide 104.

For example, assume that the width of a light beam is 250 $\mu m$ at the micro collimating lens 102a, that the divergence angle at the collimating lens 102a is 0.15 degrees, that the length of the common waveguide 104 is 100 mm, and that each of prisms 408a–415a does not have the respective lens surfaces 408b–415b. In this case, a light beam is nearly double in size at the other end of the common waveguide 104. Namely, in such condition, where a light beam having width of 250 $\mu m$ propagated through a 100 mm long PLC 104, the width of light beam would become 500 $\mu m$ wide.

In the structure as shown in FIGS. 1-8, a common waveguide 104 is used to propagate a plurality of light beams. A light beam input to the light deflection element 103a has different output paths dependent upon voltages applied to the electrodes 103c, 103d, 103e, and 103f. Obviously, the number of the electrodes are dependent upon the number of prism pairs incorporated in the light deflection element 103a. In FIG. 9, although there are n inputs, only two optical paths 402a and 402n are shown for exemplary purposes. The optical path 402a is the shortest optical path in the channel 406a. The optical path 402n is the longest optical path in the channel 406a. The number of optical paths is equal to the number of the channels. Where there are 64 channels in the common waveguide 404 or an optical switching device, there may be 64 optical paths, and the respective lengths of 64 optical paths are different from each other.

The structure shown in FIG. 9 resolves an additional problem which is due to the fact that the lengths of the 64 optical paths differ. The variation of the lengths of optical path causes variation of beam size at the opposing end of the common waveguide 404, causing substantial variation in the intensities of the various light beams. This is because the amount of divergence is a function of the path length. The greatest difference in the length of the light path is between when the light travels straight across the structure and when the light travels diagonally across the structure and, therefore, these two states will have the greatest difference in beam size at their respective output channels. These differences can significantly deteriorate the performance of a multi-channel system. Introducing external electro-optic lenses in the path of the beam can compensate for this broadening. However, external lenses require additional power to collimate the beam, significantly increase the size of the circuit, and require an additional control system which should be coupled with the EO prism deflector control.

As shown in FIG. 9, the shape of the electro-optic prism deflector of the present invention enables self-compensation of the diffraction induced beam broadening which is caused by the different light path lengths for beams propagating through different device channels.

In FIG. 9, a light deflecting device uses electro-optic (EO) changes of the refractive index (RI) of the EO material in order to make beam deflection. As previously noted, thin films or single crystalline bulk materials with EO properties can be used, and there is a wide range of EO materials, for instance LN, PLZT, PZT, etc.

The light waveguide of the present invention may be formed in a crystal, using Ti in-diffusion into LN. A manufacturing method of an optical switching device with Ti in-diffusion is described in a U.S. patent application Ser. No. 09/932,526, the disclosure of which is incorporated herein by reference.

A light waveguide may be also formed by depositions of a lower cladding layer, a core layer, and a top cladding layer in the case of PZT film waveguide. The RI of the core layer is set to slightly higher than the RI of the cladding layers.

The generally triangular shaped electrodes on top and bottom of the EO film are used to induce changes in the RI of the EO film. The change of the RI of the EO film, therefore, result in deflection of a light beam which passes through the EO film. A light beam into the device from an optical fiber is collimated with a micro-lens which is placed on the input side of the light deflection elements 103a.

A collimated beam enters the light deflection elements 103a from the input side of the light deflection elements 103a. A series of EO prisms may be formed on the waveguide layer as a part of light deflection elements 103a. Biasing the triangle shaped electrodes with a DC voltage leads to RI changes in the series of the EO prisms. Depending on the direction of the applied field, either positive or negative potential on the top electrode, the RI of the film either increases by $\Delta N1$ or decreases by $\Delta N2$. The changes of the RI result in deflection of the emitting light beam as shown in FIG. 9. Where no DC voltage is applied to the electrodes, the light beam is not deflected. The non-deflected light beam is introduced to a point C at the second side of the common waveguide 404. The deflected light beams is introduced to a point D where a light beam is deflected to maximum angle. The point where a deflected light beam is introduced may be varied by changing the value of the DC voltage applied to the electrodes, or by applying the DC voltage to a different number of electrodes.

Typically, the light beam propagating through the common waveguide 404 has a Gaussian distribution of intensity. Diffraction causes divergence of the Gaussian light beam resulting in beam broadening at the output end of the common waveguide 404. As shown in FIG. 9, dashed lines shows a broadened light beam along path A–C, which has a width W at the distal end of the common waveguide 404. For example, a 250 μm wide Gaussian beam will become about 500 μm wide after propagating through a 100 mm long common waveguide 404.

As can be seen in FIG. 9, there is a difference in the propagation lengths between a non-deflected beam and the maximally deflected beam from the lower most channel 406a. The non-deflected beam has a length from a point A to a point C. The deflected beam has a length from the point A to a point D. The length from the point A to a point B is equal to the length A–C. The length difference between the length A–C and the length A–D is a length B–D. The difference of path length B–D depends on the length of the common waveguide 404 as well as the deflection angle at the first deflection elements 103a. The additional path length B–D may be as large as 20–30% of the length of the non-deflected beam, e.g. the length A–C. The longer path length of the deflected beam causes greater broadening of the beam, resulting in variations in the size of the beam at the output points C through D.

In order to compensate for differences in divergence for different beam paths, the input side of the triangle shaped prisms 408a–n, 410a–n, are rounded, and the output side of the triangle shaped prisms 409a–n, 411a–n, are rounded. The rounding of the sides of the prisms creates an EO lens which compensates for the divergence of the beam. Since the EO lens is formed with the same electrode as the deflector, the stronger is the EO deflection the stronger is correction of the divergence. In other words, the lens shape changes with applied voltage, so that both the deflection of the light path and the divergence correction depends on the applied voltage. Thus, no additional beam shaping takes place for the beam which is not deflected at the light deflection element, while the highest correction of the divergence is applied for the most deflected beam at the light deflection element. By choosing the appropriate radius of curvature for the EO lens, it is possible to eliminate completely the divergence differences for different beam paths. As shown in FIG. 9, the shape of the input surface 412, 414 of the prism 408a–n, and 410a–n, is convex. The prisms have a positive change of RI upon applied field. The shape of the output surface 413, 415 of the prisms 409a–n, 411a–n, is concave. The prisms 409a–n, 411a–n, become negative prisms, which have negative change of RI upon applied electrical field.

FIGS. 10(A) and 10(B) are drawings for explanation of divergence correcting by EO deflector.

FIG. 10 shows the beam shaping in more details. FIG. 10(A) shows a regular electro-optic prism deflector 502 with a flat surface 502a at the light input side of the prism 502. Different beam shapes are shown for the cases of the non-diverging beam of which the width of the non-diverging beam is a length between points A and A*, when the width of light beam incident to the prism is a width d. The width CC* is a width of diverging beam diverging at an output surface 501a of the micro-lens 501. The width BB* is a width of non-diverging deflected beam deflected by the prism 502. The width DD* is a width of diverging deflected beam deflected by the prism 502.

FIG. 10(B) shows a divergence correcting electro-optic prism deflector 504 with a rounded shape at the input side surface 504a of the prism 504. The prism deflector 504 corrects the beam divergence when in the on-state, namely when the voltage is applied to the prism deflector 504. The diverging non-deflected beam has a width CC*, while the diverging deflected beam has a width DD* at roughly the same propagation distance. Additional collimation of the beam in the on-state makes the beam size DD* in width smaller than that of the original non-corrected beam CC*.

To evaluate the amount of the beam shaping correction, the EO lens correction angles for LN and PZT/PLZT films are calculated. In FIG. 10, the height L of the triangle shape prism 504 is taken to be 500 μm. Maximum RI change for LN is taken $\Delta n = 8e^{-4}$, whereas for PZT it is 0.04. This values correspond to the EO RI change of these materials upon application of the voltages 5 V/μm and 10V/μm for LN and PLZT films, respectively. These values are below the breakdown voltages for these materials. The distance h from the triangle edge to the top of the lens is varied from 10 to 50 μm. This extra spacing can be easily be accommodated in a device design and will slightly increase the total device length by a maximum of several hundred μm.

FIG. 11 illustrates calculated angular correction of divergence for $LiNbO_3$ and PZT. The divergence correction angle per a single prism with rounding in the cases of LN and PLZT are shown in FIG. 11 as a function of spacing h. Note that for LN the angle is multiplied by a factor of 10 to highlight the properties of interest.

It is seen that in the case of LN for h=50 μm the correction angle per prism is only 0.001°. This is too small to make a significant difference for a 0.1° divergence. Using LN the correction can become substantial only if a very large number of prisms are used and/or the distance h is increased to several hundred of microns. On the other hand, for PLZT films the situation is very different. For the distance h=50 μm the correction angle per prism is 0.045°. Therefore, for example, if there are four prisms for one channel at the input end of the light deflection elements, the total correction angle is 0.18°. This value is very comparable to the diffraction induced beam divergence for beam sizes of 200–300 μm. Therefore, with PLZT adjusting the curvature of the EO lens, that is spacing h, it is possible to compensate for the beam broadening due to the different paths of the deflected and non-deflected beams.

Several other considerations should be taken into account when designing the systems with EO divergence compensating prisms. According to the nature of light the diffraction induced divergence starts again after passing through the second lens. This case is elucidated in FIG. 12.

FIG. 12 depicts the collimation of a Gaussian beam in a two lens optical system. A lens 510 on the left side of FIG. 12 is a micro-lens which collimates a light beam coming from an input optical fiber. A larger lens 512 on the right side of FIG. 12 is an EO lens, which is formed on an input side of a prism deflector. In FIG. 12, the preferred triangular portion the prism deflector is omitted for simplicity. The left lens 510 collimates the incident light into a light beam of width w.

The diffraction induced divergence at the lens 510 results in broadening of the beam with angle θ. A value of the angle θ depends on the wavelength λ of the light beam. A value of the width w of the light beam is calculated according to the formula $\theta=\lambda/\pi w$. When the light beam is re-collimated by the second lens 512 at the right side of FIG. 12, the collimated light beam width becomes w* and the second lens 512 causes a smaller divergence angle θ*. Moreover, the origin of the divergence is shifted to the right by the distance R as shown in FIG. 12. Therefore, choosing the appropriate values of w, w*, R, L, and h, it is possible to compensate the divergence of the non-deflected and deflected beams and thus the final beam size to be equal at the points C through D of the output channels.

According to the present invention, it is possible to deflect light beam over a wider angle by the light deflection elements, and it is possible to accommodate more channels in an optical switch apparatus.

It is described in the disclosure that the shape at one side surface of the triangle prisms is rounded, for example, in the form of a segment of a regular circular lens. While a "rounded" shape may take the form of a portion of a circle, other shapes are effective in achieving the benefits of the present invention, and there are several other lens shapes and types which may be used. For example, the segment may be elliptical rather than circular. As is known in the lens art, other shapes may result in better collimation. For example, a Fresnel lens shape can be used. Fresnel lenses have the advantage of providing much better collimation and therefore the same range of collimation is established with lower voltage applied to the prisms. However, Fresnel lenses are significantly more difficult to design and they are more sensitive to processing tolerances.

In accordance with another embodiment of the present invention, a separate prism/lens combination may be used for the purpose of divergence correction. Thus, instead of using the new prism shape with a rounded side, a separate regular prism and regular lens can be used. The lens and prism can be powered with the same voltage or can be controlled separately.

It is to be understood that this invention is not limited to those embodiments and modifications described in the specification. Modifications and variations can be made one skilled in the art without departing from the sprit and scope of the invention. Moreover, any one or more features of any embodiment of the invention may be combined with any one or more other features of any other embodiment of the invention, without departing from the scope of the invention.

What is claimed is:

1. An optical switching apparatus, comprising:

a common waveguide;

a first plurality of light deflection elements provided at an input side of said common waveguide, each input side light deflection element including at least one generally prism-shaped element comprising an electro-optic material;

a second plurality of light deflection elements provided at an output side of said common waveguide, each output side light deflection element including at least one generally prism-shaped element comprising an electro-optic material;

a plurality of lenses provided at the input side of said common waveguide, each of said lenses collimating a light beam which is guided to each of said first plurality of light deflection elements; and a plurality of variably controllable light correction elements at said input side for correcting divergence of the light beam which passes through the first plurality of light deflection elements.

2. The optical switching apparatus of claim 1, wherein said light correction elements are lenses.

3. The optical switching apparatus of claim 2, wherein a light correction lens is provided adjacent to an input surface of said at least one generally prism-shaped element of each of the first plurality of light deflection elements.

4. The optical switching apparatus of claim 2, wherein a light correction lens is provided adjacent to an output surface of the prism-shaped element of each of the second plurality of light deflection elements.

5. The optical switching apparatus of claim 1 wherein each of said first and second plurality of light deflection elements comprises at least one pair of generally prism-shaped elements.

6. The optical switching apparatus of claim 5 wherein each of said light deflection elements comprises a plurality of pairs of generally prism-shaped elements.

7. An optical switching apparatus, comprising:

a common waveguide;

a first plurality of light deflection elements provided at an input side of said common waveguide, each light deflection element including a generally prism-shaped element comprising electro-optic material;

a second plurality of light deflection elements provided at an output side of said common waveguide, each light deflection element including a generally prism-shaped element comprising electro-optic material; and a plurality of lenses provided at the input side of said common waveguide, each of said lenses for collimating a light beam input at each of said first plurality of light deflection elements;

wherein the input surface of each said generally prism-shaped element of said first plurality of light deflection elements has a convex surface.

8. The optical switching apparatus of claim 7, wherein an output surface of each of said generally prism-shaped element of said second plurality of light deflection elements has a concave surface.

9. The optical switching apparatus of claim 7 wherein said opto-electric material is selected from the group comprising lead lanthanum zirconate titanate, lead zirconate titanate, and lithium niobate.

10. The optical switching apparatus of claim 7 wherein said opto-electric material is lead zirconate titanate.

11. An optical switching apparatus, comprising:
a common waveguide;
a first plurality of light deflection elements provided at one side of said common waveguide, the light deflection elements including a prism of electra-optic material; a second plurality of light deflection elements provided at other side of said common waveguide, the light deflection elements including a prism of electro-optic material; a plurality of lenses provided at the one side of said common waveguide, each of said lenses collimating a light beam which is guided to each of said first plurality of light deflection elements; and
wherein an output side surface of the prisms of the second plurality of light deflection elements is a concave surface.

12. The optical element of claim 11 wherein said opto-electric material is selected from the group comprising lead lanthanum zirconate titanate, lead zirconate titanate, and lithium niobate.

13. An optical switching apparatus, comprising:
a common waveguide;
a first plurality of light deflection elements provided at an input side of said common waveguide, each input side light deflection element including a generally prism-shaped element comprising electra-optic material; and
a plurality of light correction elements for correcting divergence of the light beams which pass through the first plurality of light deflection elements,
wherein said plurality of light correction elements are lenses and wherein each said lens is an integral portion of said generally prism-shaped element.

14. An optical switching apparatus as claimed in claim 13, further comprising a plurality of lenses provided at the input side of said common waveguide, each of said lenses collimating a light beam which is guided to each of said first plurality of light deflection elements.

15. An optical switching apparatus as claimed in claim 13, further comprising a second plurality of light deflection elements provided at an output side of said common waveguide, each output side light deflection element including a gelierally prism-shaped element of electra-optic material.

16. The optical element of claim 15, wherein said opto-electric material is lead zirconate titanate.

17. A generally prism-shaped stationary optical element for use in an optical switching apparatus, said optical element comprising an opto-electric material and having an integral lens surface, wherein said prism shaped element and said integral lens surface are defined by electrodes counled to said opto-electric material.

18. An optical switching apparatus, comprising:
a common waveguide:
a first plurality of light deflection elements provided at an input side of said common waveguide, each input side light deflection element including a generally prism-shaped element comprsing electro-optic material;
a plurality of light correction elements for correcting divergence of the light beams which pass through the first plurality of light deflection elements;

wherein said plurality of light correction elements are lenses and wherein each said lens is an integral portion of said generally prism-shaped element; and
wherein said generally prism-shaped optical element is generally triangular with one curved surface.

19. An optical switching device comprising:
a plurality of optical inputs, each optical input having a collimating lens for collimating an input light beam and at least one pair of generally prism-shaped stationary optical elements for receiving said collimated input light beam from said lens, each of said generally prism-shaped optical elements comprising opto-electric material,
a controllable source of electrical potential coupled to each of said generally prism-shaped input elements for modifying the optical properties thereof, such that said input light beam may be controllably deflected,
at least one controllable light correction element positioned between at least one of said collimating lenses and a corresponding generally prism-shaped light deflection element;
a waveguide for carrying the light beams after they have exited said optical inputs;
a plurality of optical outputs each optical output having at least one pair of generally prism-shaped stationary optical elements for receiving a light beam after it has traveled through said waveguide, each of said generally prism-shaped optical elements comprising opto-electric material, and a collimating lens for collimating an output light beam after it has exited said generally prism-shaped output elements, and
a controllable source of electrical potential coupled to each of said generally prism-shaped output elements for modifying the optical properties thereof, such that said light beam received from said waveguide may be controllably deflected.

20. A light switching apparatus comprising
a plurality of input optical switching devices of claim 19 coupled to a plurality of optical fibers for carrying a plurality of input light signals;
a plurality of intermediate optical switching devices of claim 19 orthogonally oriented in respect to said input optical switching devices,
a plurality of output optical switching devices of claim 19 orthogonally oriented in respect to said intermediate optical switching devices and coupled to plurality of optical fibers for receiving a plurality of output light signals.

21. The light switching apparatus of claim 20 comprising at least sixty-four of said input, intermediate and output optical switching devices.

22. The optical switching device of claim 19 wherein said opto-electric material is lead zirconate titanate.

23. A three-dimensional optical switch comprising a plurality of individual optical switching devices, each of said individual optical switching devices comprising:
a plurality of optical inputs, each optical input having a collimating lens for collimating an input liaht beam and at least one pair of generally prism-shaped stationary optical elements for receiving said collimated input light beam from each said lens, each of said generally prism-shaped optical elements comprising opto-electric material,
a controllable source of electrical potential coupled to each of said generally prism-shaped input elements for modifying the optical properties thereof, such that said input light beam may be controllably deflected, a waveguide for carrying the light beams after they have exited said optical inputs;

a plurality of optical outputs each optical output having at least one pair of generally prism-shaped stationary optical element for receiving a light beam after it has traveled through said waveguide, each of said generally prism-shaped optical elements comprising opto-electric material, and a collimating lens for collimating an output light beam after it has exited said generally prism-shaped output elements, and a controllable source of electrical potential coupled to each of said generally prism-shaped output elements for modifying the optical properties thereof, such that said light beam received from said waveguide may be controllably deflected, wherein:

a plurality of said optical switching devices form an input to said three dimensional optical switch and are coupled to a plurality of optical fibers for carrying a plurality of input light signals;

a plurality of said optical switching devices form an intermediate portion of said three dimensional optical switch, said intermediate optical switching devices being orthogonally oriented in respect to said input optical switching devices, a plurality of said optical switching devices form an output of three dimensional optical switch, said output optical switching devices being orthogonally oriented in respect to said intermediate optical switching devices and coupled to plurality of optical fibers for receiving a plurality of output light signals, and wherein a plurality of arrayed waveguide gratings couple said input and output optical fibers to said input and output optical switching devices respectively.

24. The light switching apparatus of claim 23 comprising erbium doped fiber amplifiers coupled to said arrayed waveguide gratings.

25. An optical device for controllably deflecting a light beam, comprising:

an input for receiving the light beam, a collimating lens for collimating the light beam, a deflector formed in electro-optical material for controllably deflecting the light beam, said deflector being defined by at least one pair of electrodes coupled to said electro-optical material, such that the amount of deflection is a function of the potential applied between said electrode pair, a light divergence correction element formed in said electro-optical material and positioned between said collimating lens and said deflector for controllably correcting divergence of light beam, said light divergence correction element being defined by at least one pair of electrodes coupled to said electro-optical material, such that the correction is controlled as a function of the potential applied between said electrode pair.

26. The optical device of claim 25 wherein an electrode pair is used to define both said deflector and said light divergence correction element.

27. The optical device of claim 26 wherein at least one of said electrodes has a curved surface which defines, in whole or in part, said light divergence correction element.

* * * * *